TELEVISION RECEIVER

Filed April 4, 1955

INVENTOR.
Kurt Schlesinger
BY
Mueller & Aichele
Attys

United States Patent Office 2,905,856

Patented Sept. 22, 1959

2,905,856

TELEVISION RECEIVER

Kurt Schlesinger, La Grange, Ill., assignor to Motorola, Inc., Chicago, Ill., a corporation of Illinois Application April 4, 1955, Serial No. 498,990

8 Claims. (Cl. 315—27)

Figure 1:
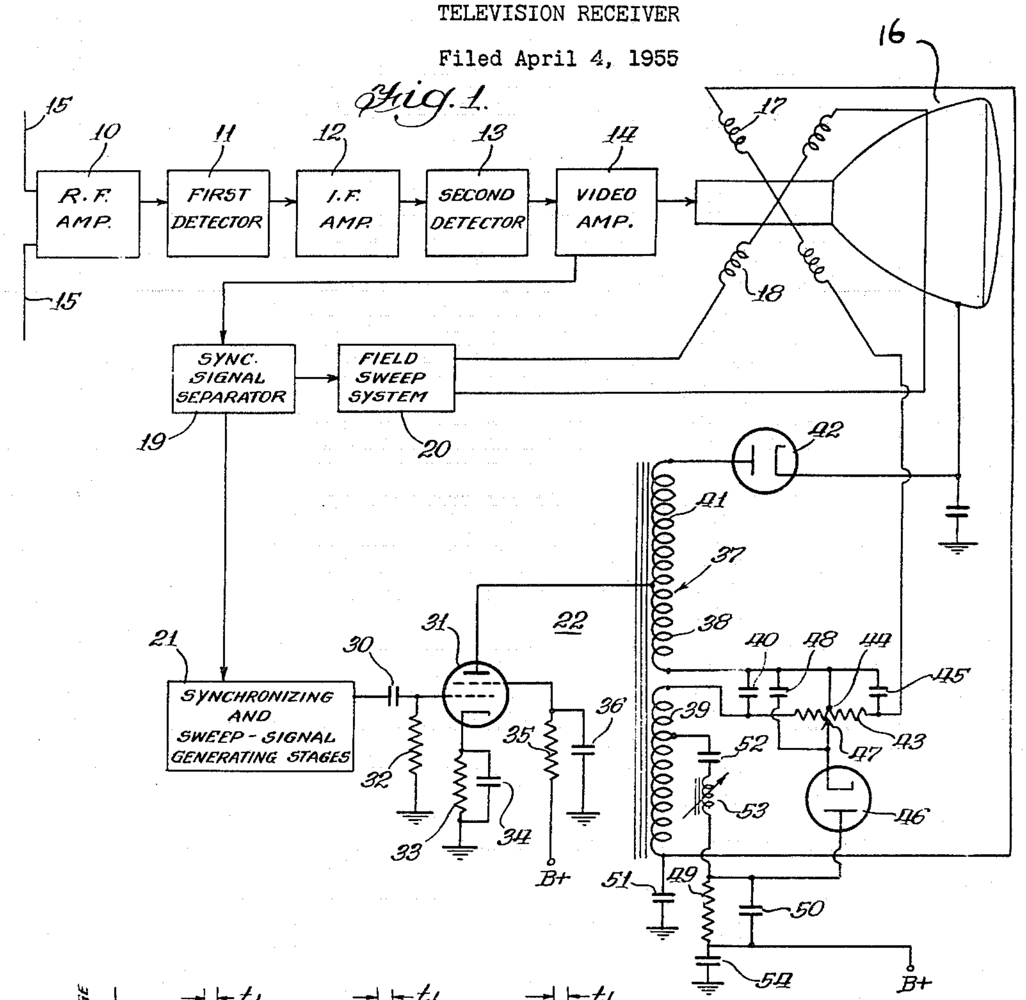

The present invention relates to television receivers in which the cathode-ray beam of a cathode-ray image reproducer is electromagnetically deflected recurrently for image reproduction. More particularly, the invention relates to a line or horizontal sweep system output circuit which is constructed to compensate for nonlinearities which tend to occur in the sweep output signal, and to an output circuit which includes an improved centering control for the cathode-ray beam in the image reproducer.

Present day television receivers usually include a line or horizontal sweep system in which a power output stage is connected to supply a sawtooth current through a coupling transformer to suitable electromagnetic deflection coils associated with the image reproducer. Such a sweep system usually employs a damper device shunted across the beam deflection coils. When such a device is used, the energy stored in the deflection coils during the retrace intervals of the cathode-ray beam causes a current flow through the damper during a portion of each trace interval. This current is combined with the current output from the power output stage to form a resultant sweep output current which is essentially linear with respect to time. This resultant current produces the deflection in the image reproducer and uniform, nondistorted reproduction is obtained as long as this current is linear throughout the entirety of each trace interval.

The resultant sweep output current, however, has a tendency to vary from the linear at the beginning and at the end of each trace interval. This variation produces crowding on each side of the reproduced image and has long proved to be a troublesome effect. It has been found that the nonlinearities in the deflection or sweep current can be compensated by controlling the current flow through the damper tube, and the problem has been to produce such a compensating effect with sufficient power to correct the nonlinearities by economical and commercially feasible means.

It is, accordingly, a general object of the present invention to provide an improved output circuit for a scanning or sweep system which is constructed to compensate for nonlinearities in the sweep output current and thereby reduce distortions in the reproduced image.

A further object of the invention is to provide such an improved output circuit in which adequate compensation is achieved by means of a relatively simple and economical arrangement.

Another problem that has become particularly troublesome with color television is the provision of a convenient and efficient centering means for the reproduced image. The provision of satisfactory electrical centering arrangements when autotransformers are used in the sweep system has proved impractical in the past, and it has been usual in black and white receivers to provide centering by physically tilting the focus coil or other elements on the neck of the image reproducer. However, such a mechanical control is not feasible with color television, and electrical centering is indicated. Yet it is most desirable to use autotransformers in the sweep systems of color receivers. Therefore, the need arose for an efficient and practical electrical centering control for an autotransformer sweep system. It was previously thought that this could be achieved only by the addition of numerous chokes and shunt inductances across the output, which rendered the use of such a control commercially impractical.

It is, accordingly, another object of the present invention to provide an improved sweep system output circuit such as referred to above and which is constructed so that manually controlled electrical centering may be achieved by a simple and economical arrangement in an autotransformer type of sweep system.

A feature of the invention is a provision of an output circuit for a sweep system in which retrace pulses are used to develop a compensating voltage of proper wave shape and phase to correct nonlinearities in the scanning action.

Another feature of the invention is the provision of such an output circuit in which the retrace pulses are derived from a coupling transformer of the autotransformer type, and are used to excite a series-resonant network to obtain a compensating signal of the appropriate phase and frequency and of sufficient power to correct the aforementioned nonlinearities in the sweep output current.

Another feature of the invention is the provision of an improved sweep system output circuit using an autotransformer and which is constructed to incorporate a manual centering control for the reproduced image; this control being accomplished by interrupting the direct current return in the sweep transformer and directing the direct current through a potentiometer in series with the sweep coils, the potentiometer being constructed to develop voltages thereacross of controllable amplitude and polarity for centering purposes.

Figure 2:
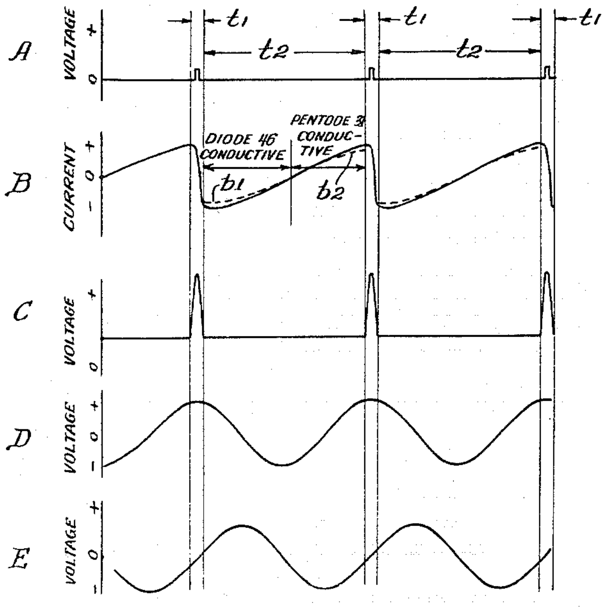

The above and other features of the invention which are believed to be new are set forth with particularity in the appended claims. The invention itself, however, together with further objects and advantages thereof, may best be understood by reference to the following description when taken in conjunction with the accompanying drawings in which:

Fig. 1 shows a television receiver constructed to incorporate the improved sweep system output circuit of the present invention; and Fig. 2 represents curves explaining the operation of the sweep system.

The television receiver of Fig. 1 includes the usual radio frequency amplifier 10, first detector 11, intermediate frequency amplifier 12, second detector 13 and video amplifier 14, these stages all being connected in cascade in a manner well understood in the art. The input terminals of radio frequency amplifier 10 are connected to an appropriate antenna 15 and the output terminals of video amplifier 14 are connected to the input electrode of a cathode-ray image reproducing device 16. The image reproducer has the usual means for developing a cathode-ray beam therein, and it includes electromagnetic horizontal deflection coils 17 and electromagnetic vertical deflection coils 18 for deflecting the cathode-ray beam over a target area.

Video amplifier 14 is also connected to a synchronizing signal separator 19 which, in turn, is connected to a field sweep system 20 and to the synchronizing and sweep-signal generating stages 21 of the line sweep system 22. The output terminals of field sweep system 20 are connected to the field deflection coil 18, and the line sweep system 22 is connected to the horizontal or line deflection coils 17 in a manner to be described.

The operation of the receiver thus far described, briefly, is as follows. A television signal which includes the usual line and field synchronizing component and video frequency component is intercepted by antenna 15 and is amplified by amplifier 10. The amplified signal is heterodyned in the first detector 11 to the selected intermediate frequency of the receiver, and the resulting intermediate frequency signal is amplified in amplifier 12. The signal from amplifier 12 is detected in second detector 13 to produce a composite video signal, and the latter signal is amplified in video amplifier 14 and used to control the intensity of the cathode-ray beam in reproducer 16. The line and field synchronizing components are separated from the composite video signal by separator 19 and are used to synchronize the field sweep system 20 and line sweep system 22.

The present invention is concerned with the line or horizontal sweep system 22, and that system will now be described in detail. The output terminal of unit 21 is coupled through a coupling capacitor 30 to the control electrode of an electron discharge device 31, which is preferably a pentode and which is connected as a power output stage. The control electrode is connected to a point of reference potential or ground through a resistor 32, and the cathode of device 31 is connected to ground through a resistor 33 shunted by a capacitor 34. The screen electrode of device 31 is connected to the positive terminal B+ of a source of unidirectional potential through a screen dropping resistor 35 and is by-passed to ground through a capacitor 36. Device 31 is coupled to the line or horizontal deflection coils 17 through an output circuit that includes an inductance coupling means in the form of an autotransformer 37 having a first winding section 38 and a second winding section 39. Transformer 37 also has a high voltage winding 41 which is connected to the upper end of winding 38. Winding 41 is connected through a high voltage rectifier 42 to the accelerating electrode of image reproducer 16 and develops a high D.C. voltage in a manner well understood in the art.

The anode of device 31 is connected to the common junction of windings 38 and 41. The electromagnetic horizontal deflecting coils 17 are connected in shunt with the winding section 39 through a potentiometer resistor 43, the resistor being connected in series with the deflecting coils 17 and the winding section 39. Resistor 43 has an intermediate point 44, which may be the midpoint thereof, connected to the lower end of winding 38. A damping diode 46 has its cathode connected to a movable tap 47 on resistor 43. Resistor 43 is by-passed for alternating current by three capacitors 40, 45 and 48 having a common junction, and these capacitors may conveniently be of the electrolytic type contained in a single container. Capacitor 40 by-passes the intermediate point 44 to one end of resistor 43, capacitor 45 by-passes that point to the other end of the resistor, and capacitor 48 by-passes the movable tap 47 to the intermediate point 44.

The anode of diode 46 is connected to the positive terminal B+ of a source of unidirectional potential, which source is by-passed to a point of reference potential or ground for alternating currents by a capacitor 54. The lower end of winding section 39 is tied to ground through a capacitor 51 across which a bootstrap potential is developed which assists the direct-current potential from the terminal B+.

A series resonant network tuned to the line frequency and including a capacitor 52, a variable inductance coil 53 and a resistor 49, is connected across a portion of winding section 39 to be excited by the line retrace pulses to develop a control voltage across resistor 49 in a manner to be described. Resistor 49 is interposed between the anode of diode 46 and the positive terminal B+, and this resistor is shunted by a capacitor 50 which by-passes harmonics of the control voltage.

Transformer 37 delivers a sawtooth sweep current to the line or horizontal electromagnetic deflecting means 17 to cause the cathode ray beam in reproducer 16 to scan the target area during a series of successive line trace intervals and interposed line retrace intervals. The transformer develops a retrace pulse during each of the retrace intervals, these retrace pulses being rectified by device 42 to produce a high D.C. voltage for the accelerating electrode of reproducer 16, as previously pointed out.

As shown in curve A of Fig. 2, the unit 21 develops a series of line synchronizing pulses during successive retrace intervals which are impressed on the control grid of pentode 31 to synchronize the line sweep with the incoming television signal. The retrace intervals are indicated by "$t_1$" in Fig. 2, whereas the trace intervals are indicated by "$t_2$." As shown in curve B, the sweep system develops a resultant sawtooth current in the deflection coils 17 that is essentially linear during each of the trace intervals $t_2$. The diode 46 is highly conductive for the first half of the trace and contributes the major portion of the resultant sweep current, the pentode 31 is highly conductive for the latter half of the trace and contributes the major portion of the resultant sweep current, and both the devices are non-conductive during retrace. As previously noted, there is a tendency for the sawtooth current to lose its linearity at the edges of the picture, and this is represented by the dotted line $b_1$ at the beginning of the trace intervals and the dotted line $b_2$ at the end of the trace intervals.

To correct the tendency for the sawtooth wave to follow the path $b_1$ at the beginning of each trace interval, it is necessary that a positive voltage be interposed at the anode of diode 46 during such intervals to increase the conductivity of the diode to increase the current flow through the diode and, therefore, the resultant negative current flow in coil 17. To correct the tendency for the sawtooth wave to follow the path $b_2$ at the end of each trace interval, it is necessary that the current through the diode be decreased to increase the resultant positive current flow in coil 17. Therefore, a negative voltage must be developed across resistor 49 to correct the latter tendency.

Curve C of Fig. 2 shows the retrace voltage pulses that are developed across transformer 37 during retrace intervals. If these pulses are to be used, the control signal derived therefrom must be essentially in phase therewith for proper compensation, and the derived control signal must have sufficient power to affect the line sweep current a sufficient extent for the required compensation. These two requirements are met by the provision of a series-tuned network 52, 53 and 49 across a portion of winding section 39, and by making resistor 49 sufficiently low that the signal developed thereacross has sufficient power to affect the desired compensation. As previously noted, capacitor 50 functions to by-pass harmonics of the retrace pulses which tend to distort the sweep current.

In accordance with the present invention, therefore, an essentially sinusoidal control signal, such as shown in curves D and E of Fig. 2, is developed in network 52, 53, 49, which signal appears across resistor 49 to be interposed in the anode circuit of diode 46. The control signal normally has positive peaks occurring during retrace intervals as shown in curve D, this being due to the characteristics of the series-resonant network 52, 53 and the resistive characteristics of resistor 49. Inductance coil 53 may be manually varied, however, so that the phase of the control voltage may be shifted between certain limits as shown in curve E. In curve E, the phase has been adjusted so that the positive peaks provide compensation for the paths $b_1$ by increasing the conductivity of the diode at the beginning of each trace, and the negative peaks decrease the conductivity of the diode at the end of each trace to compensate for the paths $b_2$. Therefore, a convenient manually adjustable linearizing control voltage is obtained across resistor 49 which produces the desired linearizing effect in the line sweep current at the beginning and end of each sweep interval, and which effect can be manually controlled by variation of inductance coil 53.

To center the reproduced image, it is necessary to provide a bridge circuit for the direct current supply. This is achieved by interrupting the transformer winding to form the two sections 38 and 39, and by completing the deflection coils 17 and transformer loop by a four-terminal potentiometer 43, the latter being bypassed by the large capacitors 40, 48 and 45. In this manner, the alternating current sweep current is not affected by the potentiometer, but the direct current is routed through the deflection coils 17 in either direction by moving the tap 47, thereby controlling the picture position.

In a constructed embodiment of the invention, the following circuit constants were used, and these are listed herein merely by way of example and are not intended to limit the invention in any way:

| | | |
|---|---|---|
| Pentode **31** | | 6CD6 |
| Resistor **33** | ohms | 100 |
| Capacitor **34** | microfarads | 10 |
| Resistor **35** | ohms | 15,000 |
| Capacitor **36** | microfarads | 0.1 |
| Capacitor **40** | do | 10 |
| Capacitor **48** | do | 10 |
| Capacitor **45** | do | 10 |
| Potentiometer **43** | ohms | 0–100 |
| Diode **46** | | 6AX4 |
| Capacitor **52** | microfarads | .02 |
| Inductance coil **53** | millihenries | 10 |
| Capactior **50** | microfarads | 0.2 |
| Resistor **49** | ohms | 100 |
| Capacitor **51** | microfarads | 1 |
| Capacitor **54** | do | 10 |

The invention provides, therefore, an improved and simplified output circuit for a line or horizontal sweep system. Compensation is provided for scanning nonlinearities by the provision of a simple series tuned network which utilizes the retrace pulses for developing a control voltage of this purpose, and in which the phase of the control voltage is adjustable manually to provide a manual control for linearity. Moreover, the output circuit of the present invention includes an improved manual centering control whereby centering of the reproduced image is achieved in an autotransformer type of output circuit by a simple and expedient network.

I claim:

1. In a television receiver which includes a cathode-ray image reproducer having means for developing a cathode-ray beam therein and electromagnetic means for deflecting the beam over a target area, and which further includes a sweep system having a power output stage; an output circuit for the sweep system including in combination, a transformer for delivering a sawtooth current from the power output stage to the electromagnetic deflecting means to cause the beam to scan the target area during a series of successive trace intervals and interposed retrace intervals, said transformer developing a retrace pulse thereacross during each of said retrace intervals, a damper device connected in shunt with at least a portion of said transformer for damping out oscillations which would otherwise occur during each cycle of said sawtooth current, a series-resonant network connected to said coupling transformer to be excited by the retrace pulses appearing thereacross, resistance means included in series in said series-resonant network for developing in response to said retrace pulses a sine wave control voltage having the frequency of the retract pulses, said control voltage wave developed in said resistance means having peaks substantially in phase with the retrace pulses, and means for interposing said control voltage wave in series with said damper device to modify each cycle of said sawtooth current delivered to the electromagnetic deflecting means.

2. In a television receiver which includes a cathode-ray image reproducer having means for developing a cathode-ray beam therein and electromagnetic means for deflecting the beam over a target area, and which further includes a sweep system having a power output stage; an output circuit for the sweep system including in combination, a transformer for delivering a sawtooth sweep current from the power output stage to the electromagnetic deflecting means to cause the beam to scan the target area during a series of successive trace intervals and interposed retrace intervals, said transformer having a secondary winding connected to the electromagnetic deflecting means and across which a retrace pulse is developed during each of said retrace intervals, resistance means, a damper diode connected in series with said resistance means, means connecting said resistance means and said diode in shunt with at least a portion of said secondary winding to damp out oscillations which would otherwise occur during each cycle of said sawtooth current, a series-resonant network connected to a point on said secondary winding to be excited by the retrace pulses appearing thereacross, and means connecting the end of said series-resonant network remote from said secondary winding to the common junction of said diode and said resistance means to produce across said resistance means in response to said retrace pulses a cyclic control voltage wave having the frequency of the retrace pulses, said control voltage wave produced across said resistance means being substantially in phase with the retrace pulses, said control voltage wave modifying each cycle of said sawtooth current delivered to the electromagnetic deflecting means.

3. The combination set forth in claim 2 in which the resonant frequency of said series-resonant network is adjustable to control the phase of said control voltage wave with respect to said retrace pulses.

4. In a television receiver which includes a cathode-ray image reproducer having means for developing a cathode-ray beam therein and electromagnetic means for deflecting the beam over a target area, and which further includes a sweep system having a power output stage; an output circuit for the sweep system including in combination, an autotransformer having first and second winding sections series-connected for alternating-currents but mutually isolated for direct current, the output stage being connected to said first winding section and the electromagnetic deflecting means being connected in shunt with said second winding section, resistance means, a damping diode connected in series with said resistance means, a potentiometer series-connected with said second winding section and the electromagnetic deflecting means and having an intermediate point connected to said first winding section and further having a variable tap, means connecting said resistance means and said diode to said movable tap on said resistance means in shunt with said second winding section, means for connecting the end of said resistance means remote from said diode to a source of undirectional potential, a series-resonant network connected to a point on said second winding section, and means for connecting the end of said series-resonant network remote from said second winding section to the common junction of said diode and said resistance means.

5. The combination set forth in claim 4 in which capacitive means is shunt-connected with said resistance means for by-passing harmonics of the retrace pulses.

6. The combination set forth in claim 4 in which said first and second winding sections are series-connected through a capacitor.

7. In a television receiver which includes a cathode-ray image reproducer having means for developing a cathode-ray beam therein and electromagnetic means for deflecting the beam over a target area, and which further includes a sweep system having a power output stage; an output circuit for the sweep system including in combination, an autotransformer having first and second winding sections, capacitor means connecting said winding sections in series, the output stage being connected to the end of said first winding section remote from said capacitor means and the electromagnetic deflecting means being connected in shunt with said second winding section, shunt-connected resistance means and capacitance means, a damping diode having an anode connected to said shunt-connected resistance and capacitance means and having a cathode, potentiometer means series-connected with said second winding section and the electromagnetic deflecting means, said potentiometer means having an intermediate point connected to the common junction of said first winding section and said first-named capacitor means and having a movable tap connected to said cathode of said damping diode, means for coupling said shunt-connected resistance and capacitance means to the end of said second winding section remote from said first-named capacitor means, means for connecting said shunt-connected resistance and capacitance means to a source of unidirectional potential, a series-resonant network connected to an intermediate point on said second winding section, and means for connecting said series-resonant network to the anode of said diode.

8. A television receiver including in combination, a cathode ray image reproducer having means for developing a cathode ray beam therein and electromagnetic means for deflecting the beam over a target area, a sweep system having a power output stage, said stage including a transformer for delivering cyclically varying current therefrom to the electromagnetic deflecting means, circuit means connecting said electromagnetic deflecting means in shunt with at least a portion of said transformer, said circuit means including a potentiometer having end terminals series connected between said transformer and the electromagnetic deflecting means, said potentiometer having an adjustable intermediate tap, a damping device having first and second electrodes, circuit means connecting said first electrode of said damping device to said adjustable tap and connecting said second electrode to unidirectional potential supply means, and means connecting said second electrode to said transformer means so that said damping device is connected in shunt with at least a portion of said transformer means and a control voltage wave is applied to said second electrode, with the position of said adjustable intermediate tap controlling the current from said unidirectional supply means through said electromechanical deflecting means to thereby control the center position of the beam with respect to the target area.

References Cited in the file of this patent

UNITED STATES PATENTS

| | | |
|---|---|---|
| 2,498,007 | Schade | Feb. 21, 1950 |
| 2,536,857 | Schade | Jan. 2, 1951 |
| 2,580,977 | Tourshou et al. | Jan. 1, 1952 |
| 2,613,334 | Otis et al. | Oct. 7, 1952 |
| 2,644,103 | Fyler | June 30, 1953 |
| 2,745,986 | Preisig | May 15, 1956 |
| 2,781,475 | Flyer | Feb. 12, 1957 |
| 2,784,344 | Vonderschmitt | Mar. 5, 1957 |
| 2,799,799 | Vonderschmitt | June 16, 1957 |